(12) United States Patent
Pravetz et al.

(10) Patent No.: US 8,555,078 B2
(45) Date of Patent: Oct. 8, 2013

(54) RELYING PARTY SPECIFIABLE FORMAT FOR ASSERTION PROVIDER TOKEN

(75) Inventors: James D. Pravetz, Sunnyvale, CA (US); Joseph D. Steele, Danville, CA (US); Sunil Agrawal, Milpitas, CA (US)

(73) Assignee: Adobe Systems Incorporated, San Jose, CA (US)

( * ) Notice: Subject to any disclaimer, the term of this patent is extended or adjusted under 35 U.S.C. 154(b) by 989 days.

(21) Appl. No.: 12/040,445

(22) Filed: Feb. 29, 2008

(65) Prior Publication Data

US 2013/0125197 A1 May 16, 2013

(51) Int. Cl.
- G06F 21/00 (2013.01)
- H04L 29/06 (2006.01)
- H04L 21/00 (2006.01)
- G06F 15/16 (2006.01)

(52) U.S. Cl.
USPC ........... 713/185; 713/155; 713/182; 709/206; 709/229; 726/9

(58) Field of Classification Search
USPC ......... 713/168–174, 182–186, 202; 709/225, 709/229; 726/2–8
See application file for complete search history.

(56) References Cited

U.S. PATENT DOCUMENTS

| | | | |
|---|---|---|---|
| 6,018,724 A | 1/2000 | Arent | |
| 6,141,758 A | 10/2000 | Benantar et al. | |
| 6,199,113 B1 | 3/2001 | Alegre et al. | |
| 6,292,185 B1 | 9/2001 | Ko et al. | |
| 6,378,075 B1 | 4/2002 | Goldstein et al. | |
| 6,453,353 B1 | 9/2002 | Win et al. | |
| 6,668,322 B1 | 12/2003 | Wood et al. | |
| 6,675,153 B1 | 1/2004 | Cook et al. | |
| 6,732,277 B1 | 5/2004 | Vandergeest et al. | |
| 6,763,370 B1 | 7/2004 | Schmeidler et al. | |
| 6,766,454 B1 | 7/2004 | Riggins | |
| 6,775,704 B1 | 8/2004 | Watson et al. | |
| 6,892,307 B1 | 5/2005 | Wood et al. | |
| 6,970,852 B1 | 11/2005 | Sendo et al. | |
| 7,100,049 B2 | 8/2006 | Gasparini et al. | |
| 7,222,303 B2 | 5/2007 | Oren et al. | |
| 7,237,256 B2 | 6/2007 | Cheng et al. | |

(Continued)

FOREIGN PATENT DOCUMENTS

WO 2006/115859 2/2006

OTHER PUBLICATIONS

U.S. Appl. No. 12/040,333, filed Feb. 29, 2008.
U.S. Appl. No. 12/194,356, filed Aug. 19, 2008.

(Continued)

*Primary Examiner* — Ashokkumar Patel
*Assistant Examiner* — Evans Desrosiers
(74) *Attorney, Agent, or Firm* — Wolfe-SBMC

(57) ABSTRACT

A security component may be associated with a network-enabled application. The network-enabled application may request access to restricted content from a relying party (e.g., web site). The security component associated with the network-enabled application may receive authentication policy information from the relying party and send a user's authentication credentials to an assertion provider to authenticate the credentials. The relying party may trust the assertion provider to authenticate user credentials. Upon successful authentication, the assertion provider may return an assertion token to the security component and the security component may sign the assertion token as specified in the authentication policy information. Subsequently, the security token may forward the signed assertion token to the relying party and the relying party may grant access to the restricted content.

21 Claims, 7 Drawing Sheets

(56) References Cited

U.S. PATENT DOCUMENTS

| | | | |
|---|---|---|---|
| 7,263,663 | B2 | 8/2007 | Ballard et al. |
| 7,430,537 | B2 | 9/2008 | Templeton et al. |
| 7,516,412 | B1 | 4/2009 | de Waal et al. |
| 7,552,467 | B2 | 6/2009 | Lindsay |
| 7,562,222 | B2 | 7/2009 | Gasparini et al. |
| 7,562,304 | B2 | 7/2009 | Dixon et al. |
| 7,698,442 | B1 | 4/2010 | Krishnamurthy et al. |
| 7,739,512 | B2 | 6/2010 | Hawkes |
| 7,761,566 | B2 | 7/2010 | Adelman et al. |
| 8,353,016 | B1 | 1/2013 | Pravetz |
| 2002/0077837 | A1 | 6/2002 | Krueger et al. |
| 2002/0186249 | A1 | 12/2002 | Lu et al. |
| 2003/0033545 | A1 | 2/2003 | Wenisch et al. |
| 2003/0069792 | A1 | 4/2003 | Blumenthal |
| 2003/0126136 | A1 | 7/2003 | Omoigui |
| 2003/0149781 | A1* | 8/2003 | Yared et al. ............... 709/229 |
| 2003/0233483 | A1 | 12/2003 | Melchione et al. |
| 2004/0015729 | A1 | 1/2004 | Elms et al. |
| 2004/0088578 | A1 | 5/2004 | Chao et al. |
| 2004/0103339 | A1 | 5/2004 | Chalasani et al. |
| 2004/0119746 | A1 | 6/2004 | Mizrah |
| 2004/0133846 | A1 | 7/2004 | Khoshatefeh et al. |
| 2004/0139319 | A1 | 7/2004 | Favazza et al. |
| 2005/0015593 | A1 | 1/2005 | Cheng et al. |
| 2005/0097060 | A1 | 5/2005 | Lee et al. |
| 2005/0125677 | A1 | 6/2005 | Michaelides |
| 2005/0138373 | A1 | 6/2005 | Clark et al. |
| 2005/0138381 | A1 | 6/2005 | Stickle et al. |
| 2005/0160064 | A1 | 7/2005 | Lehtonen et al. |
| 2006/0021031 | A1 | 1/2006 | Leahy et al. |
| 2006/0212520 | A1* | 9/2006 | Logue et al. ............... 709/206 |
| 2006/0242572 | A1 | 10/2006 | Grantham |
| 2006/0253358 | A1 | 11/2006 | Delgrosso et al. |
| 2007/0107054 | A1 | 5/2007 | Averbuch et al. |
| 2007/0118609 | A1 | 5/2007 | Mullan et al. |
| 2007/0203852 | A1 | 8/2007 | Cameron et al. |
| 2007/0204325 | A1* | 8/2007 | Cameron et al. ............... 726/1 |
| 2007/0277032 | A1 | 11/2007 | Relyea |
| 2007/0288392 | A1 | 12/2007 | Peng et al. |
| 2007/0300057 | A1 | 12/2007 | Corcoran et al. |
| 2008/0005223 | A1 | 1/2008 | Flake et al. |
| 2008/0109883 | A1 | 5/2008 | Hernoud et al. |
| 2008/0184358 | A1 | 7/2008 | Stamos et al. |
| 2008/0301701 | A1 | 12/2008 | Khijniak et al. |
| 2009/0172795 | A1 | 7/2009 | Ritari et al. |
| 2009/0327912 | A1 | 12/2009 | Gassner et al. |
| 2013/0124285 | A1 | 5/2013 | Pravetz et al. |
| 2013/0125222 | A1 | 5/2013 | Pravetz et al. |

OTHER PUBLICATIONS

U.S. Appl. No. 12/040,440, filed Feb. 29, 2008.

U.S. Appl. No. 12/195,108, filed Aug. 20, 2008.

Hameed, C.C. "Introduction to ActiveX—Part One" Nov. 16, 2007, 2 pages.

"Sxipper," 2007 Sxip Identity Corporation, 13 pages.

OASIS, "WS-SecurityPolicy 1.2," OASIS Standard, Jul. 1, 2007, 111 pages.

Dhamija, et al., "The Battle Against Phishing: Dynamic Security Skins," Symposium on Usable Privacy and Security (SOUPS) 2005, 12 pages.

MSDN, "Introducing Windows CardSpace," 2011 Microsoft, downloaded from the Internet on Jul. 6, 2011, 16 pages.

Eclipse, "Eclipse Releases Its First User-Centric Identity Framework," Press Release, 2011 The Eclipse Foundation, downloaded from the Internet on Jul. 6, 2011, 3 pages.

"Bank of America Expanding Online Security Feature to California; SiteKey Moving From Optional to Standard in the 20 States Where It's Available," Published Nov. 3, 2005, 2 pages.

"Bank of America Announces Industry-Leading Security Feature for Its 13.2 Million Online Banking Customers to Help Prevent Fraud and Identity Theft", © 2005 Passmark Security Inc. as verified by the Internet Archive http://web.archive.org/web/20060228013752/http://www.passmarksecurity.com/resources/bofa.html on Nov. 30, 2011, (2006), 2 pages.

"Enable Tabbed Browsing in Safari", *Free Mac Blog*, retrieved from <http://www.freemacblog.com/enable-tabbedbrowsing-in-safari/> on Feb. 17, 2012, (Nov. 9, 2005), 5 pages.

"Final Office Action", U.S. Appl. No. 12/040,333, (Dec. 7, 2011), 11 pages.

"Firefox 2 Features", retrieved from <http://web.archive.org/web/20070607033923/http://www.mozilla.com/en-US/firefox/features.html> on Feb. 27, 2012, (Jun. 7, 2007), 5 pages.

"Non-Final Office Action", U.S. Appl. No. 12/040,333, (Mar. 7, 2012), 10 pages.

"Non-Final Office Action", U.S. Appl. No. 12/040,333, (Jun. 23, 2011), 9 pages.

"Notice of Allowance", U.S. Appl. No. 12/040,333, (Aug. 31, 2012), 6 pages.

"Passmark Joins RSA Security", retrieved from <http://web.archive.org/web/20060503142028/http://www.passmarksecurity.com/resources/PassMark%20RS_%20SecurityDataSheet.pdf>, (May 3, 2006), 2 pages.

"The Pasmark Solution", *Passmark Security Inc.*, retrieved from <http://web.archive.org/web/20051230001316/http://passmarksecurity.com/solutions/index.html>on Nov. 29, 2011, (2005), 1 pages.

"U.S. Application as Filed", U.S. Appl. No. 12/040,445, (Feb. 29, 2008), 49 pages.

Festa, Paul "Microsoft Offers Tabbed Browsing in IE 6", retrieved from <http://news.cnet.com/Microsoft-offerstabbed-browsing--in-1_E-6/21_00-1_032_3-5738037.html> on Feb. 17, 2012, (Jun. 8, 2005), 20 pages.

Hameed, C. C., "IE7—Tabbed Browsing", retrieved from <http://blogs.technet.com/b/askperf/archive/2007/03/30/ie?-tabbed-browsing.aspx> on Feb. 17, 2012, (Mar. 30, 2007), 6 pages.

Oliver, Dick "Sams Teach Yourself HTML 4 in 24 Hours, Fourth Edition", *Sams Publishing Inc. Excerpt from Chapter 18* (pp. 230-241), (1999), 20 pages.

Advisory Action, U.S. Appl. No. 12/195,108, (Nov. 12, 2010), 2 pages.

Examiner's Answer to Appeal Brief, U.S. Appl. No. 12/195,108, (Apr. 1, 2011), 30 pages.

Final Office Action, U.S. Appl. No. 12/194,356, (Jan. 24, 2012), 21 pages.

Final Office Action, U.S. Appl. No. 12/195,108, (Sep. 3, 2010), 20 pages.

Non-Final Office Action, U.S. Appl. No. 12/194,356, (Mar. 3, 2011), 13 pages.

Non-Final Office Action, U.S. Appl. No. 12/195,108, (Mar. 19, 2010), 20 pages.

Restriction Requirement, U.S. Appl. No. 12/194,356, (Aug. 30, 2011), 7 pages.

* cited by examiner

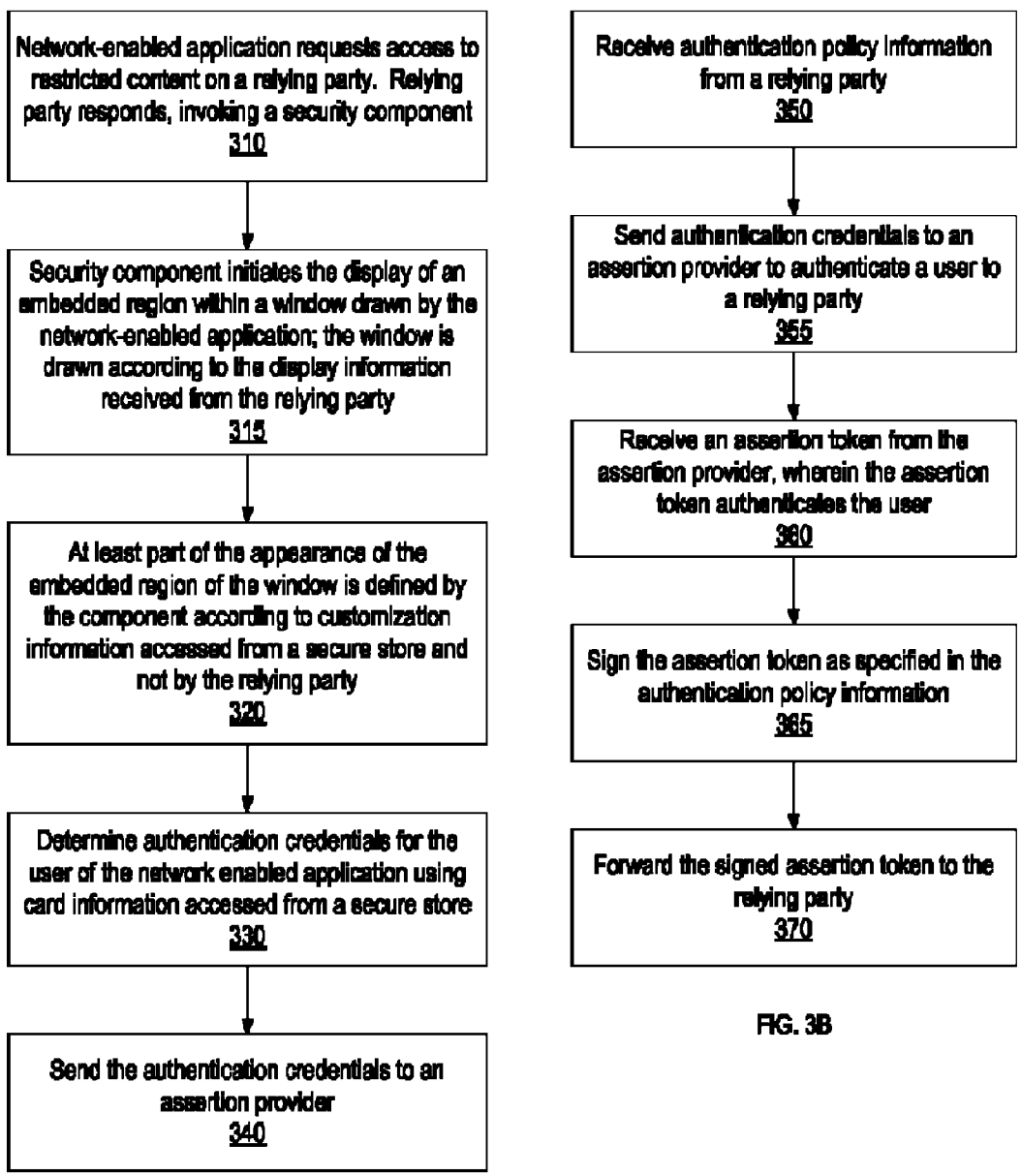

RELYING PARTY SPECIFIABLE FORMAT FOR ASSERTION PROVIDER TOKEN

BACKGROUND

Online threats have evolved over the years to be very sophisticated. An attacker has many methods available to trick a user into revealing sensitive information. For example, phishing is an attempt to acquire sensitive information by masquerading as a trustworthy entity. Online banks and payment services are common targets. Phishing is typically carried out by an email containing a link that may direct users to an authentic looking, but nevertheless non-authentic website. Once the user is at the website, he may be asked to enter sensitive information for verification purposes. When the user types in a username and password, sensitive information is compromised.

Another common threat is the man-in-the-middle attack. An attacker creates an authentic looking, but counterfeit web site (e.g., bank) and lures users to the web site. A user, thinking he is at his authentic bank web site, types in a username and password, and the attacker uses it to access the user's real bank web site. The user doesn't realize until sometime later that the attacker has completed transactions against his account. In this case, the user isn't able to authenticate the bank and the bank isn't able to authenticate the user. Many other security vulnerabilities exist on the Internet.

Mutual authentication refers to two parties authenticating each other. Typically, users authenticate themselves to a server (e.g., web server) and the server authenticates itself to the user in such a way that both parties are assured of the others' identity.

SUMMARY

Various embodiments of methods and systems of a security component associated with a network-enabled application are disclosed. A security component may be installed on a client system and execute in conjunction with the network-enabled application. A network-enabled application may be defined as any application program that may receive information from a user and convey it over a network (e.g., the Internet).

The network-enabled application may request access to restricted content at a relying party (e.g., web site). The security component associated with the network-enabled application may receive authentication policy information from the relying party. The security component may access user credentials and send the credentials to an assertion provider for authentication. The assertion provider may be trusted by the relying party to authenticate credentials. If the assertion provider successfully authenticates the user's credentials, the assertion provider may return an assertion token to the security component. The assertion token may comprise authentication information.

The security component may receive the assertion token from the assertion provider and sign the assertion token as specified in the authentication policy received from the relying party. After signing the assertion token, the security component may forward the assertion token to the relying party and the relying party may grant the network-enabled application access to the restricted content.

BRIEF DESCRIPTION OF THE DRAWINGS

FIG. 3A is a flow diagram illustrating a security component displaying an embedded region and requesting authentication from an assertion provider, according to some embodiments.

FIG. 3B is a flow diagram illustrating a security component requesting, receiving and sending an assertion token, according to some embodiments.

Figure 1:
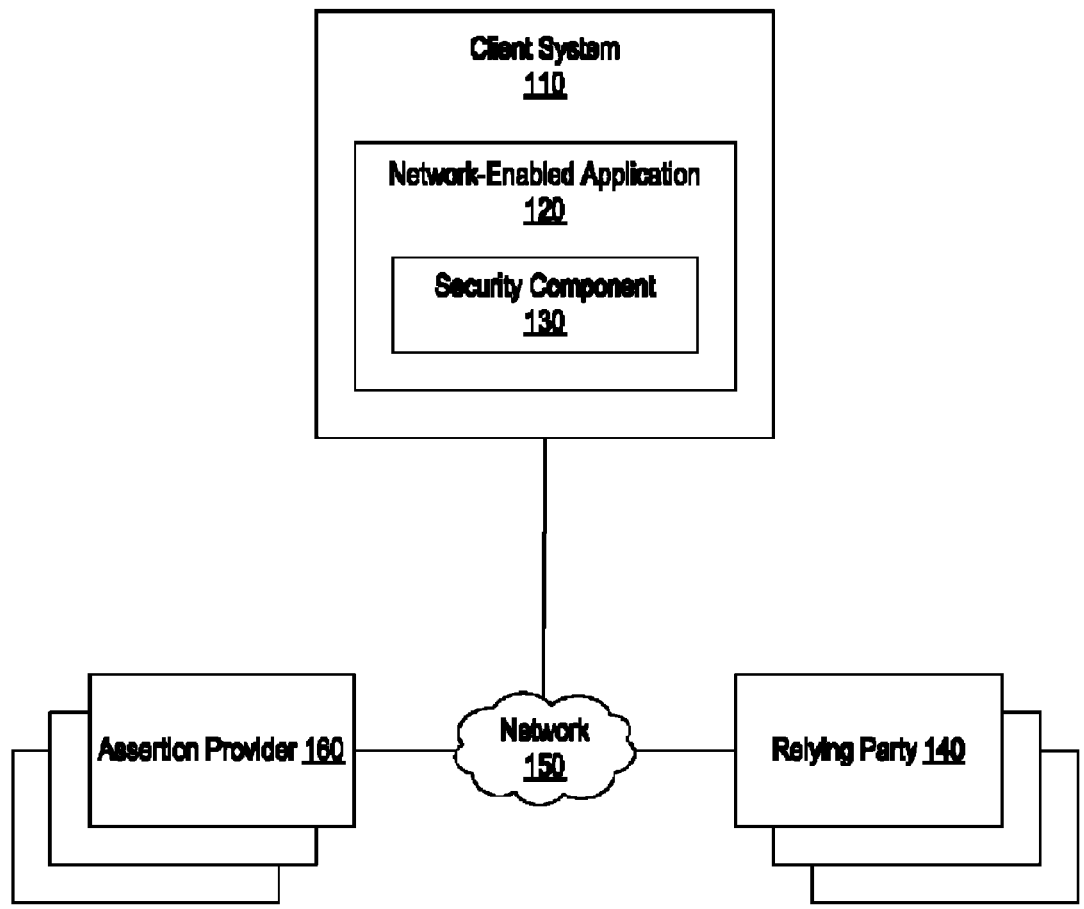
FIG. 1 is a block diagram illustrating a system for a trusted embedded user interface, according to some embodiments.

While the system is described herein by way of example for several embodiments and illustrative drawings, those skilled in the art will recognize that the system is not limited to the embodiments or drawings described. It should be understood, that the drawings and detailed description thereto are not intended to limit the system to the particular form disclosed but on the contrary, the intention is to cover all modifications, equivalents and alternatives falling within the spirit and scope of the present system as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words, "include", "including", and "includes" mean including, but not limiting to.

DETAILED DESCRIPTION OF EMBODIMENTS

Introduction

A network-enabled application may be associated with an embedded security component, configured to display a user-customized region within a displayed document (e.g., web page). When a user sees a particular embedded region displayed within the application's user interface, he or she may be assured the network-enabled application will only send the user's information to reputable relying parties. The display customizations are owned and maintained by the user and never revealed to third parties. The customizations may be displayed consistently across all reputable sites the user may visit while using the network-enabled application.

The security component may be configured to mutually authenticate a user's credentials with a relying party (e.g., web site). With mutual authentication, two parties (e.g., a client and server) may authenticate one another, such that both parties are assured of the others' identity.

Users of a client system may authenticate themselves to a relying party using the security component's challenge-response capabilities. Challenge-response protocols may not be based on shared secrets; sensitive information (e.g., a password) may not be transmitted to the relying party. A user of a client system may select an identity associated with a "Card" in order to authenticate to a relying party. A card is a metaphor for a known relying party (e.g., web site) and may include identity and authentication information needed to securely access the relying party. The card may be associated with a card image provided by the relying party and card information may be displayed within the embedded region. (See the FIG. 2 discussion below for more information regarding cards.)

The client system may send the user's credentials through a secure channel to an assertion provider, configured to authenticate the user's credentials. The relying party may trust the assertion provider to authenticate the user's credentials. Once authenticated, the assertion provider may return a secure assertion token to the client system. (An assertion token may be authentication data formatted in a way agreed upon by the assertion provider and the relying party.) The client system may subsequently forward the assertion token through a secure channel to the relying party and the relying party may authenticate the user of the client system based on the assertion token. Once authenticated, the relying party may send secure documents (e.g., restricted web pages) or other information to the client system, also via a secure channel. The authentication information exchanged between the assertion provider and the relying party may be in the form of an assertion token that may be signed by the assertion provider and may assert to the authenticity of some information, for example, a user's identity, a user's attributes and/or a user's payment for some product or service. Thus, the security component may serve as an assertion router between an assertion provider and a relying party. In various embodiments, the methods and systems described herein may be used for a client system to retrieve sensitive information from a relying party or engage in a transaction where sensitive information is securely exchanged between a client and a relying party. Sensitive information may include, but is not limited to transaction information, social security numbers, credit card numbers, financial information, payment assertions and/or other information.

Overview

FIG. 1 is a block diagram illustrating a system for implementing a trusted embedded user interface, according to some embodiments. Client system 110 may be any device configured to connect to network 150, and execute a network-enabled application. Examples of client system 110 include a personal computer, a server, a cell phone and a Personal Digital Assistant (PDA). Other implementations have been contemplated. Client system 110 may include a network-enabled application 120.

Network-enabled application 120 may be implemented as an application configured to connect to network 150 and exchange information with relying party 140 and assertion provider 160. Network-enabled application 120 may be configured to display a user interface and receive user input from an input device. In various embodiments, network-enabled application 120 may be implemented as a web browser. Examples of web browsers include Microsoft Internet Explorer™, Opera™, Safari™ and Mozilla™ FireFox™. In other embodiments, network-enabled application 120 may be implemented as a stand-alone application program (e.g., not a web browser) configured to communicate with relying party 140 and assertion provider 160 via network 150. Network-enabled application 120 may display web pages, text, images, videos, play music, and retrieve documents and/or web pages from one or more relying parties 140 (e.g., web sties) on the Internet, on a wide area network, on a local area network, or on another type of network. Network-enabled application 120 may execute on any suitable operating system, such as Microsoft™ Windows XP™, Vista™, Windows Mobile™, Linux, Unix™ and MacOS™, or another suitable operating system.

Network-enabled application 120 may communicate with relying party 140 using hypertext transfer protocol (HTTP) to fetch web pages, images and other documents. Secure communication protocols may be used. (See the discussion below regarding network 150 for more information regarding secure network protocols.)

The file format of documents and images served by relying party 140 and received by network-enabled application 120 may be implemented in, or utilize hypertext markup language (HTML), Active Server Pages™, Extensible Markup language (XML) JPEG, GIF, or another document or image type. Relying party 140 may send, and network-enabled application 120 may receive scripting code (e.g., JavaScript™) that may affect the behavior of network-enabled application 120.

Network-enabled application 120 may be configured to execute one or more plug-ins. A plug-in may be defined as a computer program that interacts with network-enabled application 120 to provide a specific function "on demand". Network-enabled application 120 may provide services used by the plug-in, including a way for the plug-in to register itself with network-enabled application 120 and a protocol with which data may be exchanged with the plug-in. A plug-in may be dependent on the services provided by network-enabled application 120 and may not work without them. Conversely, network-enabled application 120 may be independent of the plug-in, making it possible for one or more plug-ins to be added and updated dynamically without changes to network-enabled application 120. A plug-in may rely on the network-enabled application's user interface. Plug-ins may be implemented as shared libraries that may be installed in a place prescribed by network-enabled application 120. In some embodiments, the plug-in may provide virtual machine functionality. The virtual machine may run scripting code that may be compiled into byte code and may be executed by the plug-in virtual machine. In some embodiments, Adobe Flash™ may provide virtual machine capabilities and security component 130 may be implemented as a Flash™ component, compiled as a .swf file. In some embodiments, the virtual machine may include, or provide access to native extensions for cryptographic functions and secure storage, which may be available to the plug-in and components (e.g., security component 130).

Security component 130 may be implemented as a component of network-enabled application 120. In various embodiments, security component 130 may be implemented as a plug-in or a component of a plug-in utilized by or accessed by network-enabled application 120. Security component 130 may be implemented as an Active-X™ component or a widget. In some embodiments, security component 130 may be written in a scripting language and compiled into byte code. Relying party 140 may directly or indirectly invoke security component 130 on client system 110. For example, security component 130 may be downloaded from a web site (e.g., embedded in a web page) and invoked by network-enabled application 120 when received. In another case, a reference to security component 130 may be downloaded from a web site, also embedded in a web page and network-enabled application 120 may use the reference to access and invoke security component 130. Once invoked, security component 130 may interact with a plug-in or a virtual machine installed on client system 110.

In some embodiments, security component 130 may be integrated with, or be part of network-enabled application 120. Security component 130 may be implemented as one or more shared libraries (e.g., dynamic link library). In some cases, security component 130 may be installed from a storage medium (e.g., CD-ROM).

In some embodiments, security component 130 may be downloaded from relying party 140 or a third party server (e.g., web site) other than relying party 140, such as a security component vendor server. In some cases, security component 130 may be signed and loaded by network-enabled application 120, which may verify the signature.

Security component 130 may be configured to share data with network-enabled application 120 and may display information within one or more windows drawn by network-enabled application 120. Security component 130 may draw a region (e.g., rectangle) as a subset of an existing window drawn by network-enabled application 120. For example, in a web implementation network-enabled application 120 may be implemented as a web browser and may display a document (e.g., HTML document) within the web browser's main window. Component 130 may draw a region (e.g., rectangle) within the main window where the document is displayed. The embedded region may not be a separate dialog box, pop-up or a separate window, but rather an integral part of a window drawn by the network-enabled application.

Security component 130 may be configured to access the operating system of client system 110 as well as access the file system and/or any hardware device, including hardware devices used for cryptographic and/or authentication purposes (e.g., SmartCard™). Security component 130 may have access to native cryptographic APIs, classes, methods, services, libraries, functions and frameworks (e.g., .NET™, J2EE™) of client system 110.

Security component 130 may have access to security capabilities that are available on client system 110, including security capabilities provided by Windows™, MacOS™, Linux, Unix™, Firefox™, Internet Explorer™ and other applications. Security component 130 may have access to Microsoft™ Cryptographic Programming Interface™ (CAPI). Security component 130 may have access to credentials stored in a Mac Key Chain, another key chain or credentials stored by Credential Service Providers (CSP).

In some embodiments, security component 130 may be configured to store digital Ids, certificates and other secret information (e.g., authentication ID 240). Digital Ids may be stored and retrieved consistently across platforms (e.g., operating systems and file systems). For example, in one embodiment security component 130 may utilize Public-Key Cryptography Standard #12 (PKCS#12). Security component 130 may provide a common method of provisioning and accessing new credentials and/or identification information across operating systems and file systems. (See the description of FIG. 4 for more information.)

When network enabled application 120 authenticates credentials with relying party 140, security component 130 may display data within a region (e.g., a rectangle) embedded in a window or web page displayed by network-enabled application 120. The information displayed within the region assures the user that the information is from a trusted entity. The embedded region may be used for interaction with the user of network-enabled application 120. For example, security component 130, displaying the embedded region, may receive a password from a user or enable account enrollment or activation with relying party 140. The embedded region may be used to display information that may only be revealed to the user for security and privacy reasons. The region may list all of the user's available identities associated with a relying party 140.

The user may customize the display of the embedded region. Customizations may include user selected images, border colors, text, background colors, border widths and/or background images. The customizations may be displayed in a way to make it difficult for an attacker to access the customized display. The customizations ensure that any information presented to the user may be trusted. The customizations may be displayed consistently for all relying parties 140 visited (i.e., the customizations may not be relying party 140 specific), and may only be shown for relying parties 140 that are established by the security component as being reputable. Non-reputable relying parties 140 may not be able to invoke the security component. (See the discussion below regarding FIG. 6 for more information regarding the displayed region.)

Relying party 140 may be any trusted system configured to connect to network 150 and communicate with client system 110. In some embodiments, relying party 140 may be implemented as a web server. Relying party 140 may service requests from client system 110. Relying party 140 may be configured to listen on a port (e.g., port 80) waiting for client system 110 to send a request message. When relying party 140 receives a request, relying party 140 may be configured to fetch content (e.g., web page) and forward the content to client system 110. Relying party 140 may be implemented as one or more physical systems connected to one or more storage devices. Relying party 140 may be configured to run special web server software configured to service client system 110 requests. Examples include Microsoft™ Internet Information Systems™ and Apache™. Other server host application software is possible. In some embodiments, relying party 140 may provide web services or be implemented as an application server.

Assertion provider 160 may be any system that provides authentication services for users of client system 110 and relying party 140. Relying party 140 may trust and rely on assertion provider 160 to authenticate identify, or other information about the user of network-enabled application 120. In some embodiments, assertion provider 160 and relying party 140 may be controlled by the same entity. For example, a bank (e.g., relying party 140) may provide it's own authentication services (e.g., assertion provider 160). In other embodiments they may be controlled by separate entities.

Assertion provider 160 may use the Security Assertion Markup Language (SAML) standard for exchanging authentication and authorization data with security component 130 and/or relying party 140. SAML is meant as an example and other suitable standards and/or protocols may be used. At the request of security component 130, assertion provider 160 may receive the user's credentials, and if the user is authenticated, pass a SAML assertion in the form of a token back to security component 130, which may forward the assertion token to relying party 140 for authentication purposes. The assertion token may include other information, such as transaction information, user attributes, digital certificate, payment information and/or a private or public key. In various embodiments, the assertion token may assert a user's rights and/or permissions. In other embodiments the assertion token may assert to a user's email address or memberships, or other information. (See the discussion below for FIGS. 4-5 for more information regarding assertion tokens and authentication.)

In various embodiments, network 150 may be configured to allow data to be exchanged between client system 110, relying party 140, and assertion provider 160. Network 150 may correspond to various methods of communication between entities and may include, but is not limited to communication via telephone, fax, email, messages (e.g., instant messaging), voice messages, and electronic documents (e.g., web page, email or file transfers). In general, network 150 may represent any method that one entity may utilize to communicate with another entity. While network 150 may be illustrated in a generalized manner, one of ordinary skill in the art will recognize that network 150 is meant to be representative of a complete communication path between the entities depicted in FIG. 1 with a specific type of communication channel. For example, network 150 may represent one or more communications channels and may include one or more telecommunications networks as well as various data networks. Network 150 may include network devices such as circuits, switches, routers, hubs and/or gateways. Network 150 may support communication via wired or wireless general data networks, such as any suitable type of network including the Internet and/or Ethernet LAN; via telecommunications/telephony networks such as analog voice networks or digital fiber communications networks; via storage area networks such as Fiber Channel SANs, or via any other suitable type of network and/or protocol. Data may be transmitted on network 150 using Hyper Text Transport Protocol (HTTP), Secure Hyper Text Transport Protocol (HTTPS), Secure Socket Layer Protocol (SSL), Transport Layer Security Protocol (TLS) or another suitable network transport protocol. In various embodiments, the services described herein may utilize any suitable cryptographic protocol and/or cryptographic algorithm when communicating over network 150.

Following is a description of one example workflow implementation. A user associated with network-enabled application 120 may send a request for a restricted document to relying party 140. Relying party 140 may return a web page or login form to network-enabled application 120, which may direct network-enabled application 120 to invoke security component 130. Security component 130 may display a user-customized appearance (e.g., previously customized by the user) in an embedded region of a window (e.g., a web page) displayed by network-enabled application 120. When the user sees the customized region, he or she may be sure of interacting with a trusted relying party 140. Security component 130 may select one or more cards associated with relying party 140 from secure store 210 and display the one or more cards, which represent identities that the user has previously established with relying party 140. The displayed card information may include relying party 140 information associated with a user's credentials and may be displayed within the embedded region. If relying party 140 is a rogue site, security component 130 may not display any cards in the embedded region and may not allow the user to enter authentication information. Once the user has selected a card (e.g., identity) and entered any needed credentials (e.g., a password), an authentication request for the user's credentials may be securely sent (e.g., SSL or TLS) to assertion provider 160. Relying party 140 may trust assertion provider 160 to authenticate user credentials.

Assertion provider 160 may validate the credentials and if successful, return an assertion token to security component 130. In some embodiments the assertion token may comprise an ephemeral <certificate, private key>. Assertion provider 160 may sign the assertion token. The assertion token, authenticating the user of network-enabled application 120, may then be returned to relying party 140. In some embodiments the assertion token may be returned in the form of a cookie.

Security component 130 may sign the assertion token in a way specified by relying party 140. The instructions for how the assertion token should be signed may be specified in the policy file and copied to secure store 210 at registration/ provisioning time. In some embodiments, the assertion token may be signed in a manner that only allows it to be used once. In one example, security component 130 may sign the assertion token using the private key received from assertion provider 160. Security component 130 may add the URL of relying party 140 to the assertion token so that relying party 140 can't replay it to other relying parties 140. In another case, security component 130 may add a nonce and/or a timestamp to the assertion token. (The nonce may have previously been received from relying party 140 and associated with a current session between client system 110 and relying party 140.) Other information may be added to the assertion token. In some cases, security component 130 may receive the assertion token from assertion provider 160 and pass the assertion token to relying party 140 without adding any additional information to the assertion token.

In a web browser implementation, after security component 130 has received the assertion token from assertion provider 160 and added any necessary information, security component 130 may forward the assertion token to network-enabled application 120, which may forward it on to relying party 140. The assertion token may be passed to relying party 140 as a query parameter, a token or an authorization header. Other methods are possible. In cases where the security component is tightly coupled to the network stack, the assertion token may be passed directly to relying party 140 without the intermediate step of passing the assertion token to the network-enabled application 120. In either case, the channel used to transport the assertion token to relying party 140 may be secure (e.g., SSL or TLS). Once the assertion token has been received, relying party 140 may authorize network-enabled application 120 to exchange restricted content with relying party 140. Restricted content may comprise a restricted document, transaction information or some other suitable information.

Policy File Description

In some embodiments, a policy file may specify authentication and communication settings and protocols. A policy file may include all of the information security component 130 needs to authenticate a user's credentials with relying party 140. One or more policy files may be located on relying party 140. Additional policy files may be located on assertion provider 160. Security component 130 may be configured to access one or more policy files on relying party 140 and/or assertion provider 160. In some embodiments, security component 130 may access policy file information or receive policy file information when network-enabled application 120 initially registers with relying party 140. In one embodiment, at registration or provisioning time, settings and specification information may be copied from the policy file into secure store 210. (See the description below regarding secure store 210 for more information on provisioning.) In another embodiment, policy file information may be accessed by security component 130 when security component 130 authenticates a user's credentials with relying party 140.

Security component 130 may be configured to download, receive, access, read, validate and parse one or more policy files. Policy file information may be stored in an Extensible Markup Language (XML) or another suitable format.

As described above, policy file information may include information for both registration and authentication scenarios. Correspondingly, there may be at least two types of policy files. One type of policy file may be used for registration. Registration is the process where a network-enabled application 120 (e.g., on client system 110) initially accesses and registers with relying party 140 and/or assertion provider 160. In this case, security component 130 may access policy file information to determine what information is required for registration. Security component 130 may read policy file information and exchange registration information with relying party 140 and/or assertion provider 160.

Another type of policy file may be an authentication policy file. Authentication information may be copied from policy file information to secure store 210 during the provisioning or registration process and the authentication information may be used every time security component 130 authenticates a user's credentials. Policy file information may tell security component 130 everything it needs to know to authenticate a user's credentials with assertion provider 160. The authentication policy may also specify how to pass the resulting assertion back to relying party 140.

Policy file information may include a list of one or more assertion providers 160 relying party 140 may accept. The list may include the address of the assertion providers 160 (e.g., Uniform Resource Identifier (URI)). Policy file information may include a list of filtering characteristics to be used when security component 130 selects an assertion provider 160. For example, filtering characteristics may include specific cryptographic authentication protocols, whereby only assertion providers 160 supporting the specified authentication protocols may be acceptable. In another example, filtering characteristics may specify that only assertion providers 160 under a particular root certificate authority may be acceptable. Policy file information may include a description of how successful authentication should be performed between security component 130 and assertion provider 160 (e.g., challenge/response, public key, username/password).

As described above, assertion provider 160 may return an assertion token to security component 130 after the user's credentials are successfully authenticated. Policy file information may include information regarding how the assertion token should be formatted, as well as a description of how the assertion token should be routed from assertion provider 160 to relying party 140. In one example, policy file information may specify that the assertion token should be passed as a form parameter in an HTTP request. In another example, policy file information may specify that the assertion token may be passed in an HTTP header or in the body of an HTTP request. Other methods and protocols are possible.

Policy file information may include additional information required by relying party 140 before the assertion token is sent from security component 130 to relying party 140. In various embodiments, relying party 140 may require that security component 130 sign the assertion token, include a timestamp or include other information, such as a nonce.

Policy file information may include information describing the appearance of the displayed embedded region related to relying party 140. Relying party 140 information may be displayed by security component 130 within the embedded region. This information may include text and/or images. (See FIG. 6 for more information.)

Policy file information may include a list of cards to be used and displayed in the embedded region for relying party 140, as well as card filter information, describing which cards may be shown within the embedded region for a relying party 140. For example, in one case only cards provisioned by a specified relying party 140 may be displayed in the embedded region. In another case, cards common to more than one relying party (e.g., a card related to a specific username and password) may be displayed. (See the descriptions below for secure store 210, cards and the screen illustration for FIG. 6 for more information.)

Policy file information may include version information, describing the version of the policy file.

Secure Store and Identity Card Description

Figure 2A:
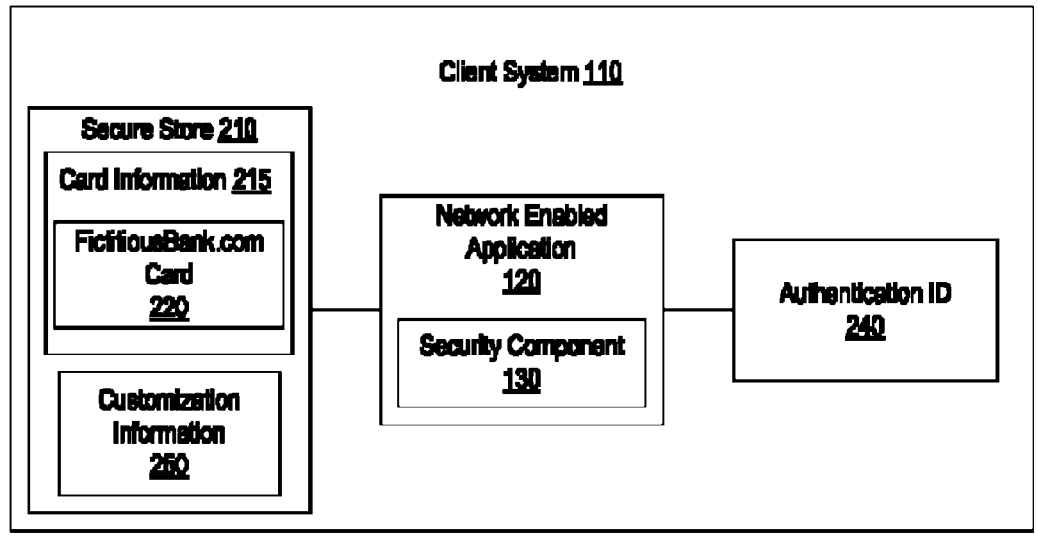
FIG. 2A is a block diagram illustrating a client system, according to some embodiments.

FIG. 2A is a block diagram illustrating a client system 110, according to some embodiments. Secure store 210 may be an encrypted file containing all of the information needed for mutual authentication between security component 130 and one or more relying parties 140. Secure store 210 may not be accessible by relying party 140. Component 130 may be configured to digitally sign, encrypt and decrypt secure store 210. In some embodiments, parts of secure store 210 may be encrypted and other parts may not be encrypted. In other embodiments, all of secure store 210 may be encrypted. Secure store 210 may be signed by security component 130.

Security component 130 may have access to the client system 110 file system, cryptographic APIs, keys and/or digital IDs required to access secure store 210. Security component 130 may access secure store 210 using one or more common techniques across platforms (e.g., file systems and operating systems). In some embodiments, security component 130 may receive a user-supplied password prior to accessing secure store 210.

Secure store 210 may include, but is not limited to:
  A list of known assertion providers 160 and their credentials.
  Information about when the user's credentials were last used. (This information may be displayed by security component 130.)
  Customization Information 250. Customization information may comprise one or more graphical user interface customizations specified by a user and applied to the user interface displayed in the embedded region by security component 130. (See the discussion regarding FIG. 6 for more information about user customizations.)
  The addresses of one or more reputation services to access in order to determine if a relying party 140 is reputable. Component 130 may be configured to allow the user to select the reputation service he/she wishes to use. (See the description below for FIG. 3A for more information.)
  Receipts generated during previous authentication sessions (e.g., payments).
  Available coupons (e.g., one-time use authentication assertion tokens).
  Card information 215, including one or more identity cards. (See the description below for secure store 210 for more information on cards.)
  Synchronization information (e.g., the last date/time secure store 210 was synchronized with a server).

Figure 2B:
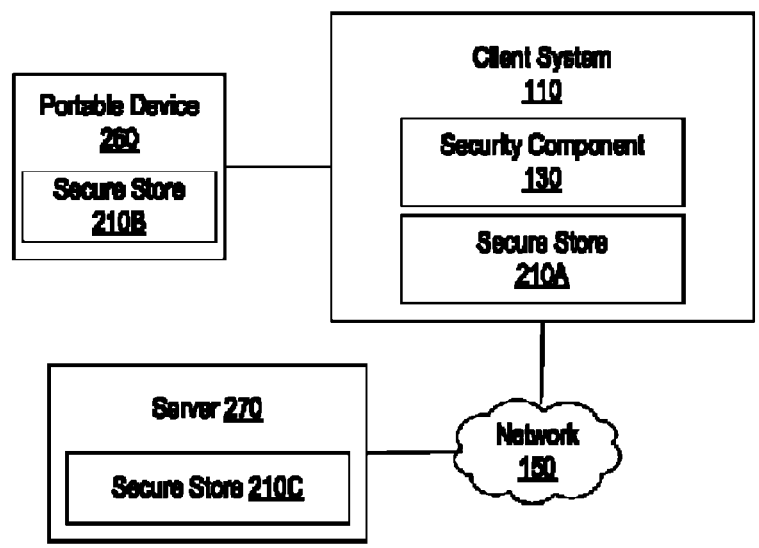
FIG. 2B is a block diagram illustrating importing and exporting a secure store, according to some embodiments.

FIG. 2B is a block diagram illustrating importing and exporting a secure store, according to some embodiments. Security component 130 may provide export and import capabilities for secure store 210A in order to allow users to roam to other systems. For example, security component 130 may import and/or export secure store 210A to server 270 (e.g., secure store 210C). Once exported the server 270, secure store 210C may be securely accessed by a user, using any system connected to a network, assuming the user has access to the proper credentials.

Security component 130 may import and/or export secure store 210 to portable device 260, (e.g., secure store 210B), which may be carried by a user to another client system. Examples of a portable device 260 include a SmartCard™, thumb drive, and USB key. Other portable devices have been contemplated. Component 130 may be configured to securely access data on the portable device using cryptographic APIs.

In some embodiments, security component 130 may periodically synchronize secure store 210A on client system 110 with server 270 and/or portable device 260. Security component 130 may be configured to synchronize secure store 210 automatically, without user intervention at a certain time interval. In other embodiments, the synchronization may occur in response to a user's request.

Security component 130 may be configured to access, read, write, encrypt and decrypt secure store 210 on portable device 260 and/or server 270. Digital identity cards may be stored in secure store 210. Identity card information (hereafter referred to as a "Card") is information describing a persona or identity associated with a user. Each card may include information indicating how authentication may take place between network-enabled application 120 and a relying party 140. In some embodiments, when a user associated with network-enabled application 120 initially "Signs Up" or registers with relying party 140, assertion provider 160 and/or relying party 140 may provision client system 110 with card information, placed within secure store 210. In some cases assertion provider 160 may be the same entity as relying party 140. In other cases they may be separate entities. Security component 130 may filter and display one or more cards associated with a assertion provider 160. A card may include a username or some other credentials identifying the user. In some embodiments, a card may include location information for credentials located outside of secure store 210, for example, authentication ID 240.

Each identity card may include, but is not limited to:

Card Identifier—A unique identifier for the identity card.

Card Image—A unique image associated with the card and displayed by security component 130. The card image helps the user identify the card from other cards. In some embodiments, the card image may be an icon.

Card Name—The name of the card uniquely identifies it.

ID Type—The type of ID to be used for authentication. Examples include an enhanced username and password (e.g., Secure Remote Password Protocol (SRP)), Standard Digital ID (StandardID), Arcot™ Digital ID (ArcotID™), or any other suitable digital identification. (The ID's storage location may be determined by policy 145 when the ID is provisioned.)

ID Location—Where the ID is stored. The ID may be the user's authentication credentials associated with the assertion provider 160. In some embodiments the ID may be stored within the secure store 210 and in other embodiments the ID may be stored separately, such as in a separate file, separate folder, and/or on a storage device (e.g., disk storage, SmartCard). In some embodiments, the ID may be stored as a key in a digital key chain.

Access Options—How to access the ID. Examples include: (1) the user must enter a password to access the ID on each use, (2) the user must enter a password the first time the secure store 210 is accessed, and (3) the user may access the ID any time after logging into client system 110.

Assertion Provider Address—The addresses (e.g., Uniform Resource Identifier (URI)) for one or more assertion providers 160 with which authentication should take place.

Protocol Specification—Indicates how communication and authentication with the assertion provider should take place.

Expiration Information—Indicates when the card information may expire.

Relying party 140 logo, text, image and customized colors. Component 130 may be configured to control what information is displayed within the embedded region for each relying party 140.

Assertion Provider 160 logo, text, image and customized colors

Site Key. A site key may include a graphic image. The site key may be one of many images assigned to a particular user by a relying party 140 or assertion provider 160.

In some embodiments, policy file information may include add-on card information. Relying party 140 may designate (within policy file) the credentials (e.g., username and password, or OpenID) required to authenticate the relying party. In this case, security component 130 may retrieve this information and create an add-on card for the user at runtime. The add-on card may function the same way as any other card found in secure store 210.

Workflow Description

FIG. 3A is a flow diagram illustrating a security component displaying an embedded region and requesting authentication from an assertion provider 160, according to some embodiments. As shown at block 310, network-enabled application 120 may request restricted access to a document or content (e.g., web page) located at relying party 140. For example, network-enabled application may request a page associated with a "Check Out" web page associated with a "Secure Cart", after purchasing one or more items online. Relying party 140 may respond and rather than being directed to a traditional login form requesting a username and password, network-enabled application 120 may be directed to security component 130. Security component 130 may display an embedded region within a document (e.g., web page) returned by relying party 140 and drawn by network-enabled application 120 as shown in block 315. If the user associated with client system 110 has previously registered with relying party 140 and assertion provider 160, one or more cards may be available in secure store 210. Security component 130 may access secure store 210 and display one or more cards. Relying party 140 may designate which cards are displayed by providing filtering information (e.g., cards for assertion providers capable of processing payment assertions). In some embodiments, if the user associated with network-enabled application 120 has not registered with relying party 140 and no card is available to authenticate the user with the relying party 140, the embedded region may not be displayed, or may be displayed with a visual indicator (e.g., large red 'X') or display a message suggesting the user may not have previously registered with relying party 140. In this case, component 130 may be disabled so that the user cannot attempt to access relying party 140.

Security component 130 may display the embedded region with a user interface customized by the user of client system 110. The user customizations may have been configured by security component 130 (or another application) in response to user input. The user may select colors, borders, border width, background images and other images to display within the embedded region. Other customizations are possible. The displayed customizations are meant to prevent phishing and indicate to the user that security component 130 has provided an assurance that the user's credentials and sensitive information are protected. The user-defined customizations may be displayed consistently for all relying parties that are established by security component 130 as being reputable. In other words, the user customizations are displayed for all cards displayed in the embedded region. Non-reputable relying parties 140 may not be able to invoke security component 130. Thus, security component 130 (not relying party 140) may control at least part of the appearance of the embedded region according to customization information accessed from secure store 210, as shown in block 320.

Security component 130 may determine a relying party 140 is reputable by accessing a reputation service, either locally on client system 110 or on a server accessible via network 150. The reputation service may include a list of trusted, reputable relying parties 140. In some embodiments, the reputation service may include a "White List" and a "Black List". The white list may include a list of relying parties 140 that are known to be trusted and the black list may include a list of relying parties 140 that are known to be untrustworthy. In various cases, a user, a system administrator or a third party reputation service may maintain these lists. Component 130 may be disabled and display a warning if a user associated with component 130 tries to access a relying party 140 on the black list.

As noted above, the location of one or more reputation services utilized by security component 130 may be indicated in secure store 210, policy file information or indicated in another suitable location, such as a server accessible by security component 130. Security component 130 may send a request to a reputation service requesting the reputation service determine the reputation of a relying party 140. For example, security component 130 may make a web service call to a reputation service requesting the reputation service provide information about a specified relying party 140. Security component 130 may receive a response back from the reputation service indicating the relying party 140 is reputable or not reputable. Subsequently, security component 130 may only display relying party information in the embedded region for relying parties 140 that are deemed reputable. In some cases, if relying party 140 is found to be un-reputable, component 130 may display an indication in the embedded region. For example, component 130 may display a large red 'X', text images or other visual queues indicating the relying party 140 is not reputable and the user associated with network-enabled application 120 should not exchange information with the relying party 140. Component 130 may be disabled so that the user may not attempt to log on to relying party 140.

In some embodiments, when a user interacts with the security component's embedded region, other portions of the computer screen may be grayed and/or inactive to impede the obscuring of the embedded region. For example, the embedded region displayed by security component 130 may be implemented as a top window and configured so as not to be obscured by another object displayed on the user interface.

In some embodiments, component 130 may be configured to detect when the displayed embedded region is obscured. For example, component 130 may create a memory buffer and copy video screen display information (e.g., pixel information) about the embedded region into the buffer. Periodically (e.g., every second) component 130 may compare the actual screen display data to the display information in the memory buffer. If the two are identical, component 130 may determine the screen may not have been obscured. If the two are different, component 130 may determine the screen may have been obscured. In the case where component 130 detects the embedded region may have been obscured, component 130 may alter the display of the embedded region. For example, some elements may not be displayed within the embedded region and/or a message may be displayed within the embedded region notifying the user that component 130 has detected the embedded region may have been obscured. In other cases, a dialog box, a message box or pop-up window may be displayed notifying the user that the embedded region may have been obscured. As shown in block 330, the user may select an identification card and enter any required credentials. In some embodiments, the card selected by the user may indicate credentials (e.g., password) must be entered. Relying party 140 may designate whether or not credentials are required for authentication. For example, a bank web site may require a password, whereas a blog web site may not. The bank may have higher security requirements. In some embodiments component 130 may determine the authentication credentials to use according to card information 215 accessed from secure store 210. In other embodiments, component 130 may create a card-add-on based on information accessed in the policy file.

Security component 130 may determine which assertion provider 160 is associated with relying party 140. In some embodiments, this information may be obtained from the card information in secure store 210. As shown in block 340, security component 130 may connect to assertion provider 160 via secure channel, send any required credentials to the assertion provider 160 and request authentication of the user.

FIG. 3B is a flow diagram illustrating a security component requesting, receiving and sending an assertion token, according to some embodiments.

As shown in block 350, security component 130 may receive authentication policy information from relying party 130. The policy information may be received when network-enabled application 120 accesses relying party 140 and requests access to a restricted document or service. As described in the description of FIG. 3A, component 130 may retrieve card information 215 associated with relying party 140 and select an assertion provider 160 based on the card information 215. Component 130 may send authentication credentials to the assertion provider to authenticate a user to relying party 140, as shown in block 350. Upon successful authentication, component 130 may receive an assertion token back from assertion provider 160, as shown in block 360. Component 130 may sign the assertion token as specified in the authentication policy information. (See block 365.) In some cases, component 130 may sign the assertion token with a private key retrieved from the assertion token received from assertion provider 160. The private key may be a public/private one-time-use key. In other cases, component 130 may sign the assertion token with another key (e.g., authentication ID 240) located on client system 110. Other keys may be used. As shown in block 370, component 130 may forward the signed assertion token to relying party 140 and relying party 140 may grant access to network-enabled application 120 based on the assertion token.

Registration and Provisioning

Figure 4:
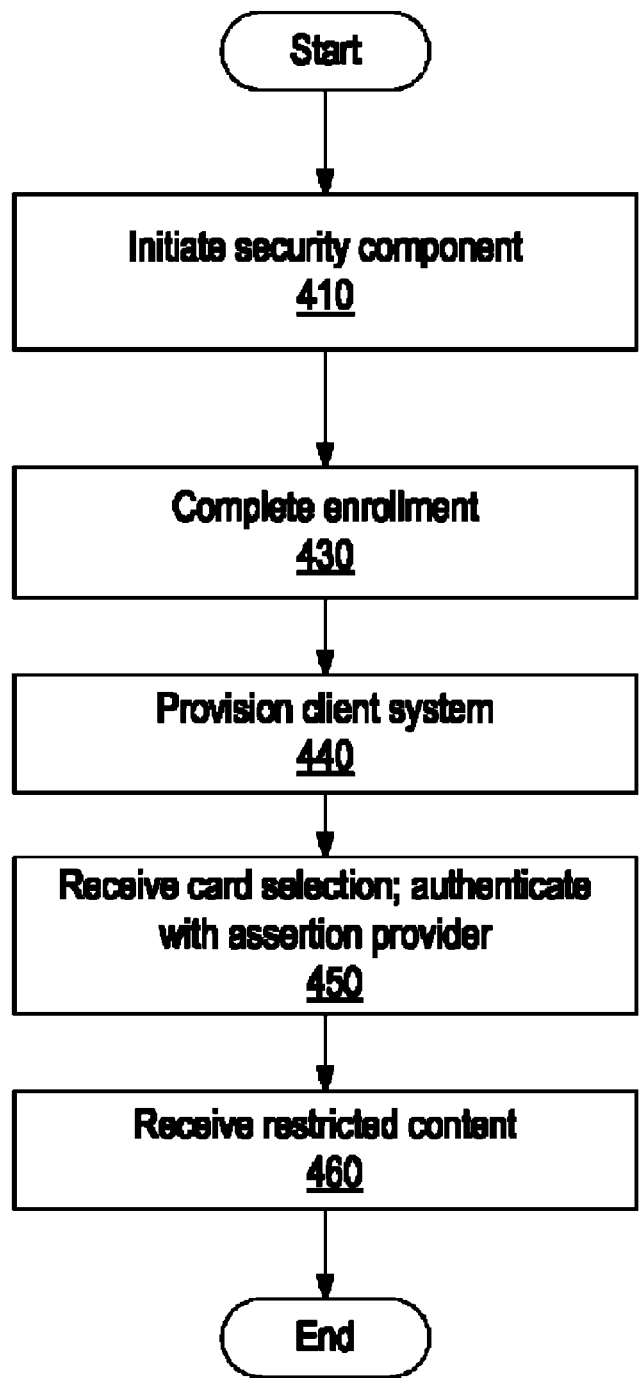
FIG. 4 is a flow diagram illustrating the provisioning of a client system, according to some embodiments.

FIG. 4 is a flow diagram illustrating the provisioning of a client system 110, according to some embodiments. In one case, Internet-enabled application 120 may request restricted content from relying party 140 and relying party 140 may determine that the user associated with Internet-enabled application has never enrolled with relying party 140.

Relying party 140 may provide a hint (e.g., link) to an enrollment document (e.g., web page) and request the user associated with Internet-enabled application 120 submit enrollment information (e.g., name, address, email, etc.), which may be required in order to enroll with relying party 140. The enrollment information may be submitted (block 430) to assertion provider 160 and relying party 140. In some embodiments, enrollment information may be submitted to relying party 140, and relying party 140 may forward the enrollment information directly (e.g., through a back-channel) to assertion provider 160. Assertion provider 160 may require enrollment information prior to providing authentication services to the user of Internet-enabled application 120.

After successful enrollment, component 130 may receive policy file information from relying party 140 and assertion provider 160. Component 130 may copy policy file information (e.g., including card information) to secure store 210, as shown in block 440. Component 130 may display the card information in the embedded region and receive card selection input from the user. Component 130 may authenticate the user by connecting to assertion provider 160, requesting authentication, receiving an assertion token, and forwarding the assertion token to relying party 140, as shown in block 450. Relying party 140 may receive the assertion token and grant access to network-enabled application 120 as shown in block 460.

Authentication Workflow

Figure 5:
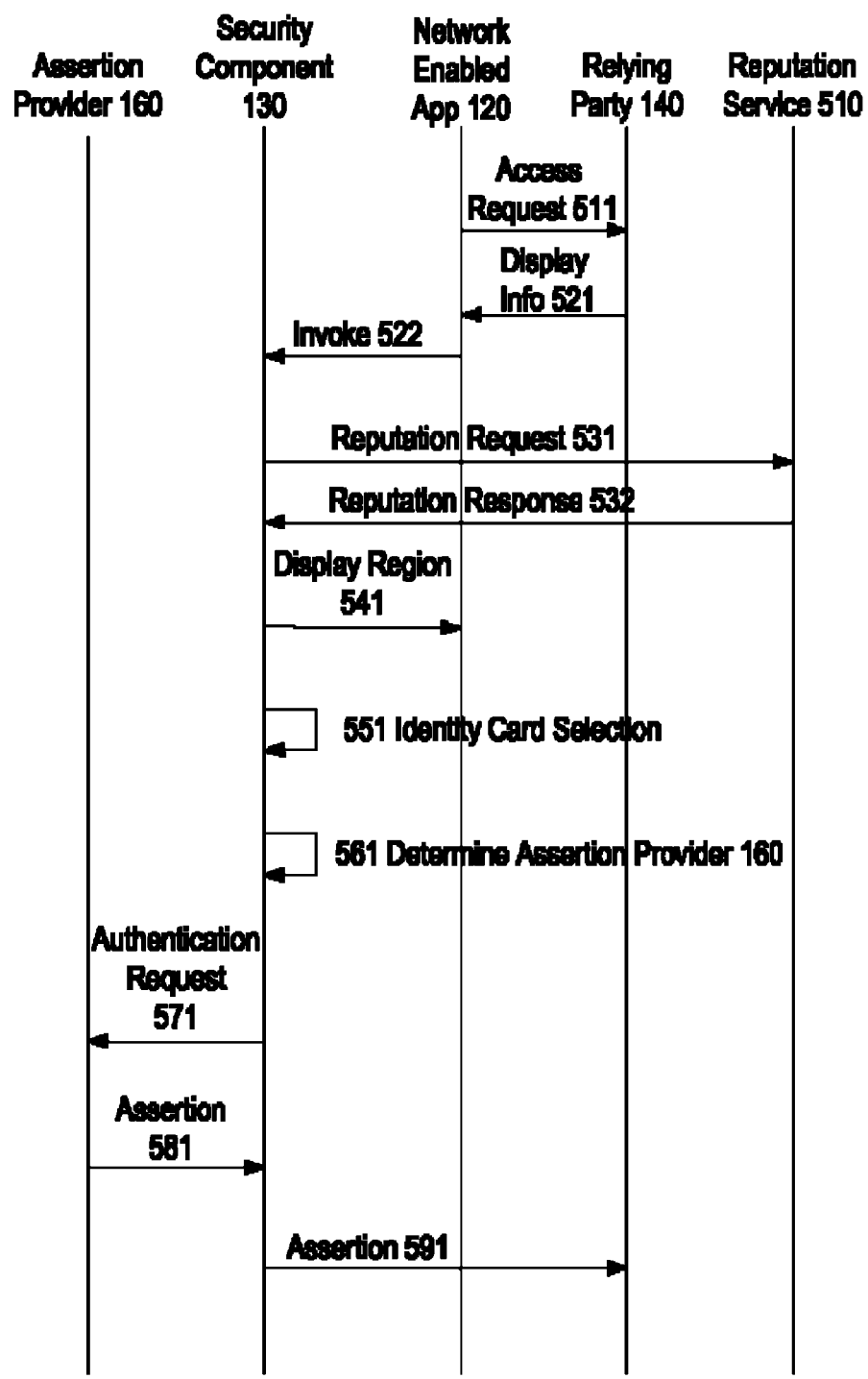
FIG. 5 is a sequence diagram illustrating a security component authenticating a user's credentials and routing an assertion token from an assertion provider to a relying party, according to some embodiments.

FIG. 5 is a sequence diagram illustrating a security component 130 authenticating a user's credentials and routing an assertion token from an assertion provider 160 to a relying party 140, according to some embodiments. Network-enabled application 120 may attempt to access restricted content (item 511) at relying party 140. Relying party 140 may attempt to gain access to an assertion token (e.g., in the form of a cookie). If the assertion token is available (e.g., cached) access may be granted. If the assertion token is not available, relying party 140 may return (item 521) display information (e.g., web page), invoke security component 130 (item 522) and provide access to an authentication policy file.

Security component 130 may determine the reputation of relying party 140. Security component 130 may retrieve the address of a reputation service 510 from secure store 210 and send a request (item 531) to the reputation service 510 requesting information about the reputation of relying party 140. In some cases the reputation service 510 may be accessed via network 150. In other cases the reputation service 510 may be accessed on client 110. The reputation service 510 may return a reputation response (item 532). If the reputation response indicates relying party 140 is not reputable, security component 130 may display an indication in the embedded region indicating the reputation service 510 is not reputable. If the reputation service indicates relying party 140 is reputable, security component 130 may display the embedded region with card information and user customization information (item 541). In the case where reputation service 510 has no information about relying party 140, component 130 may allow authentication with assertion providers 160 that are included in cards 215 located in secure store 210. In another case, a card-add-on may be used to access relying party 140. The card-add-on may not share secrets with relying party 140 (e.g., zero knowledge proof protocols).

Component 130 may receive identity card selection information from the user (item 551). Identity card selection information may include the identity with which the user wishes to use in order to authenticate with assertion provider 160. Security component 130 may determine the assertion provider 160 and access protocol to use in order to authenticate the selected identity (item 561). The assertion provider 160 and protocols used for authentication and communication may be retrieved from secure store 210. Examples of authentication protocols include SSL/TLS with client certificates, ArcotID, HTML-Form, HTTP-Basic/Digest, OpenID and Bearer cookies. Other authentication protocols are possible. Component 130 may send an authentication request (item 571) to assertion provider 160. After successful authentication, assertion provider 160 may produce an assertion token, indicating successful authentication of the user's credentials. In some embodiments, the assertion token may include information other than, or in addition to user authentication information. For example, the assertion token may include user attributes or payment information. If assertion provider 160 does not authenticate the user, it may return an error message to security component 130.

If the user's credentials are successfully authenticated, assertion provider 160 may send the assertion token back to security component 130 via secure channel, as shown at item 581. In some embodiments, steps 571 and 581 may be repeated multiple times. For example, step 581 may return an error and ask for the user's password again and component 130 may respond with the user's password. In another example, assertion provider 160 may return a response requesting component 130 to authenticate with a different authentication protocol and component 130 may respond using the specified protocol.

Security component 130 may then forward the assertion token to network-enabled application 120, which may forward the assertion token to relying party 140 as shown at items 591. In some embodiments, security component 130 may sign the assertion token according to information included in secure store 210. For example, security component 130 may sign the assertion token with authentication ID 240 or with a private key included in the assertion token received from assertion provider 160.

In another embodiment, after assertion provider 160 authenticates the user's credentials and creates the assertion token, assertion provider 160 may pass the assertion token directly to relying party 140 through a back-channel, bypassing client system 110 altogether. In this case, assertion provider 160 may pass a reference (e.g., uniform resource identifier) to relying party 140 and relying party 140 may access the assertion token by using the reference. In the case where assertion provider 160 and relying party 140 are the same entity, there may be no need to pass the assertion token. However, relying party 140 must be notified by assertion provider 160 to proceed with granting access to restricted content network enabled application 120.

In another embodiment, assertion provider 160 may be a different entity than relying party 140, but both parties may be configured to exchange assertion tokens directly through a back-channel, bypassing client system 110.

In another embodiment, assertion provider 160 may send an assertion token reference to relying party 140 (e.g., routed through client system 110 or sent directly from assertion provider 160 to relying party 140) and relying party 140 may access the assertion token value on relying party 160 by using the reference.

The Display Implementation

Figure 6:
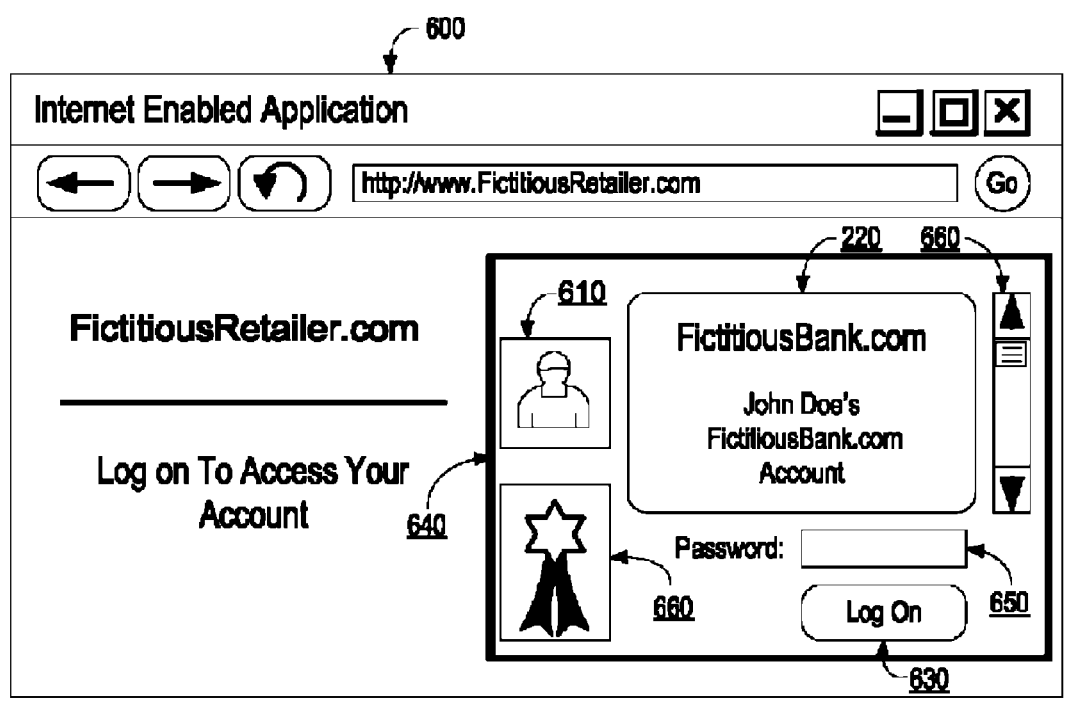
FIG. 6 is a screen illustration of a network-enabled application with an embedded security component, according to some embodiments.

FIG. 6 is a screen illustration of a network-enabled application 120 with a security component 130 generated embedded region, according to some embodiments. FIG. 6 depicts one example of how network-enabled application 120 may be implemented. Other implementations are possible, including different controls, colors, borders and menus, as well as different positions of the items depicted.

Network-enabled application 120 may draw a window and display a document (e.g., web page) as shown at item 600. The document may comprise display information received from relying party 140. In the example shown in FIG. 6, the display information is received from FictitiousRetailer.com. Component 130 may initiate the display of an embedded region within the window drawn by network-enabled application 120 as shown at item 640. The embedded region 640 may not be a separate window or separate dialog box, but rather may be a displayed rectangle region or another shape drawn within an existing window of network-enabled application 120. In some embodiments, the embedded region 640 may be included within a web page, created by a web page author. The web page author may have included a security component 130 control or reference within the web page when the web page was designed. When the web page is downloaded and received by network-enabled application 120, network-enabled application 120 may invoke security component 130, which may draw the embedded region 640.

In the example shown in FIG. 6, the relying party is FictitiousRetailer.com. Security component 130 may access secure store 210 and search for cards based on filter information received from FictitiousRetailer.com. If one or more cards are found, they may be displayed within embedded region 640, along with customization information defined by the user. In the example shown in FIG. 6, a card is found for the assertion provider 160 called FictitiousBank.com, shown at item 220.

At least a portion of the appearance of the embedded region of the window is defined according to the customization information and not by the relying party. If more than one card is found, the additional cards may also be displayed. A slider control, card selector or scroll bar control (item 660) may be used to scroll through all available cards. In some embodiments, an icon or text identifying assertion provider 160 may be displayed in item 220. This information may have been received from assertion provider 160 when the card information was provisioned.

In various embodiments, a user associated with client system 110 may customize the appearance of embedded region 640 by designating appearance settings of the embedded region 640. The user-customized appearance of embedded region 640 may be displayed by security component 130 in order to make it difficult for an attacker to spoof the appearance of the document displayed by network-enabled application 120. In some cases the user may designate graphic images (e.g., item 610 and 660) to be displayed within embedded region 640. Other possible settings include colors, borders, border widths, background colors and background images. In various embodiments, security component 130, network-enabled application 120 or another application of client system 110 may provide a customization program, or some other means for the user of client system 110 to customize the appearance of embedded region 604. The user may customize the appearance of embedded region 640 once or may update the appearance whenever desired. The customization settings 250 may be saved in a secure storage area (e.g., secure store 210).

In some embodiments, assertion provider 160 may require the user associated with client system 110 to enter information for authentication purposes. In the example shown in FIG. 6, FictitiousBank.com requires the user to enter a password at item 650 and press the "Log On" button at item 630. In various cases, other information may be requested or no information may be requested.

In some embodiments, the entire screen (other than embedded region 640) may be grayed-out when the user is interacting with the embedded region 640. In the example shown in FIG. 6, embedded region 640 may be shown normally while the rest of the screen may be grayed out. In some cases, item 640 (displayed by security component 130) may be the top window and other applications may be disabled from copying or obscuring the embedded region 640. Other techniques may be used to prevent copying or obscuring embedded region 640.

Computing Device

Figure 7:
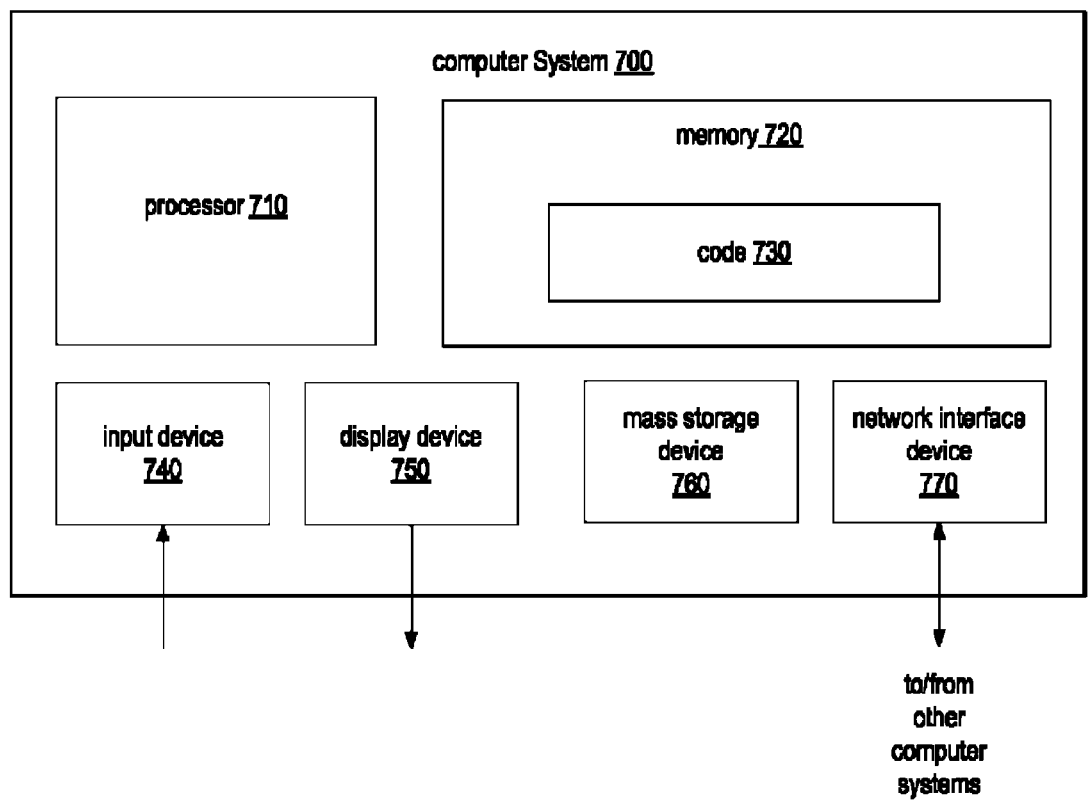
FIG. 7 is a block diagram illustrating a system for implementing a trusted embedded user interface, according to some embodiments.

FIG. 7 is a block diagram illustrating a computing device, according to an embodiment. Various security components of embodiments of the network-enabled application 120, security component 130, relying parties 140, assertion providers 160, clients 110 and nodes, etc., as described herein, may be executed on one or more computer systems, which may interact with various other devices. One such computer system is illustrated by FIG. 7. In the illustrated embodiment, computer system 700 includes one or more processors 710 coupled to a system memory 720. Computer system 700 further includes a network interface 770 and one or more input/output devices 740/750, such as a cursor control device, keyboard, audio device and display device 750. In some embodiments, it is contemplated that embodiments may be implemented using a single instance of computer system 700, while in other embodiments multiple such systems, or multiple nodes making up computer system 700, may be configured to host different portions or instances of embodiments. For example, in one embodiment some elements may be implemented via one or more nodes of computer system 700 that are distinct from those nodes implementing other elements.

In various embodiments, computer system 700 may be a uniprocessor system including one processor 710, or a multiprocessor system including several processors 710 (e.g., two, four, eight, or another suitable number). Processors 710 may be any suitable processor capable of executing instructions. For example, in various embodiments, processors 710 may be general-purpose or embedded processors implementing any of a variety of instruction set architectures (ISAs), such as the x86, PowerPC, Scalable Processor Architecture (SPARC), or Million Instructions per Second (MIPS) Instruction Set Architectures (ISAs), or any other suitable ISA. In multiprocessor systems, each of processors 410 may commonly, but not necessarily, implement the same ISA.

System memory 720 may be configured to store program instructions 730 and/or data accessible by processor 710. In various embodiments, system memory 720 may be implemented using any suitable memory technology, such as static random access memory (SRAM), synchronous dynamic RAM (SDRAM), nonvolatile/Flash-type memory, or any other type of memory. Program instructions and/or data may also be stored, for example, on a hard disk. In the illustrated embodiment, program instructions and data implementing desired functions, such as those described above for security component 130, are shown stored within system memory 720 as program instructions 730 and data storage 760, respectively. In other embodiments, program instructions and/or data may be received, sent or stored upon different types of computer-accessible media or on similar media separate from system memory 720 or computer system 700. Generally speaking, a computer-accessible medium may include storage media or memory media such as magnetic or optical media, e.g., disk or Digital Versatile Disc (DVD) Read Only Memory (ROM)/Compact Disk-Read Only Memory (CD-ROM) coupled to computer system 700. Program instructions and data stored via a computer-accessible medium may be transmitted by transmission media or signals such as electrical, electromagnetic, or digital signals, which may be provided via a communication medium such as a network and/or a wireless link, such as may be implemented via network interface 770.

Network interface 770 may be configured to allow data to be exchanged between computer system 700 and other devices attached to a network, such as other computer systems, or between nodes of computer system 700. In various embodiments, network interface 770 may support communication via wired or wireless general data networks, such as any suitable type of Ethernet network, for example; via telecommunications/telephony networks such as analog voice networks or digital fiber communications networks; via storage area networks such as Fibre Channel Storage Area Networks (SANs), or via any other suitable type of network and/or protocol.

Input/output devices 740 and 750 respectively, may in some embodiments include one or more display terminals, keyboards, keypads, touchpads, scanning devices, voice or optical recognition devices, or any other devices suitable for entering or retrieving data by one or more computer system 700. Multiple input/output devices 740 and 750 may be present in computer system 700 or may be distributed on various nodes of computer system 700. In some embodiments, similar input/output devices may be separate from computer system 700 and may interact with one or more nodes of computer system 700 through a wired or wireless connection, such as over network interface 770.

Memory 720 may include program instructions 730, configured to implement at least a portion of embodiments of the security component 130 as described herein, and data storage 760, comprising various documents, tables, databases, etc. accessible by program instructions 730. In one embodiment, program instructions 730 may include software elements of the security component 130 illustrated in the Figures, and data storage 760 may include data used in embodiments of security component 130. In other embodiments, different software elements and data may be included. Program instructions and/or data may be stored, for example, on various types of memory including hard disks.

Those skilled in the art will appreciate that computer system 700 is merely illustrative and is not intended to limit the scope of the security component 130 as described herein. In particular, the computer system and devices may include any combination of hardware or software that can perform the indicated functions, including computers, network devices, internet appliances, PDAs, mobile phones, pagers, etc. Computer system 700 may also be connected to other devices that are not illustrated, or instead may operate as a stand-alone system. In addition, the functionality provided by the illustrated security component 130 may in some embodiments be combined in fewer security components 130 or distributed in additional security components 130. Similarly, in some embodiments, the functionality of some of the illustrated security components 130 may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software security components 130 may execute in memory on another device and communicate with the illustrated computer system via inter-computer communication. Some or all of the security component 130 or data structures may also be stored (e.g., as instructions or structured data) on a computer-accessible medium or a portable article to be read by an appropriate drive, various examples of which are described above. In some embodiments, instructions stored on a computer-accessible medium separate from computer system 700 may be transmitted to computer system 700 via transmission media or signals such as electrical, electromagnetic, or digital signals, provided via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations.

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. Synchronous Dynamic RAM (SDRAM), Double Data Rate RAM (DDR RAM), RAMBUS Dynamic RAM (RDRAM), Static RAM (SRAM), etc.), Read Only Memory (ROM), etc. as well as transmission media or signals such as electrical, electromagnetic, or digital signals, provided via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A system, comprising:
  a client computer comprising one or more processors;
  the client computer further comprising a memory coupled to one or more processors, wherein the memory stores program instructions executable by the one or more processors to implement a security component associated with a network-enabled application, wherein said security component is configured to:
    receive authentication policy information at runtime on the client computer, the authentication policy information received from a remote computer of a relying party, the authentication policy information specifying that an assertion token is to be signed by the client computer prior to the client computer forwarding that assertion token to the relying party;
    send authentication credentials from the client computer to a remote computer of an assertion provider to authenticate a user of the client computer to the relying party;
    receive an assertion token from a remote computer of the assertion provider, wherein the assertion token indicates the user of the client computer has been authenticated;
    sign the assertion token on the client computer as specified in the authentication policy information received at runtime;
    forward the signed assertion token from the client computer to a remote computer of the relying party;
    determine whether the relying party is reputable;
    enable display of an indication associated with whether the relying party is reputable; and
    enable display of a region embedded within a user interface associated with the client computer, the user interface configured to display an image associated with the relying party, wherein an appearance associated with said embedded region is customizable for each relying party of a plurality of relying parties.

2. The system as recited in claim 1, wherein the security component is configured to sign the assertion token in a manner as specified in the authentication policy information from the relying party so that the signed assertion token is only valid for a single use.

3. The system as recited in claim 2, wherein the signed assertion token includes a nonce as specified in the authentication policy information from the relying party.

4. The system as recited in claim 1, wherein the security component is configured to sign the assertion token using a key received from the assertion provider.

5. The system as recited in claim 1, wherein the security component is configured to provide a user interface for the user to select the assertion provider.

6. The system as recited in claim 5, wherein the security component is further configured to access information indicating assertion providers with whom the user is registered, wherein the authentication policy information from the relying party comprises filter information usable by the security component to determine which of the indicated assertion providers to present to the user via the user interface for selection by the user.

7. The system as recited in claim 1, wherein the network-enabled application comprises a web browser.

8. A computer implemented method, comprising:
a client-side security component on a client computer receiving authentication policy information at runtime on the client computer, the authentication policy information received from a remote computer of a relying party, the authentication policy information specifying that an assertion token is to be signed by the client computer prior to the client computer forwarding that assertion token to the relying part;
the client-side security component sending authentication credentials from the client computer to a remote computer of an assertion provider to authenticate a user of the client computer to the relying party;
the client-side security component receiving an assertion token from a remote computer of the assertion provider, wherein the assertion token indicates the user of the client computer has been authenticated;
the client-side security component signing the assertion token on the client computer as specified in the authentication policy information received at runtime, wherein the client-side security component is further configured to sign the assertion token using a key received from the assertion provider;
the client-side security component forwarding the signed assertion token from the client computer to a remote computer of the relying party;
the client-side security component enabling display of a region embedded within a user interface associated with the client computer, the user interface configured to display an image associated with the relying party, wherein an appearance associated with said embedded region is customizable for each relying party of a plurality of relying parties.

9. The method as recited in claim 8, further comprising the client-side security component signing the assertion token in a manner as specified in the authentication policy information from the relying party so that the signed assertion token is only valid for a single use.

10. The method as recited in claim 9, wherein the signed assertion token includes a nonce as specified in the authentication policy information from the relying party.

11. The method as recited in claim 8, further comprising the client-side security component providing a user interface for the user to select the assertion provider.

12. The method as recited in claim 11, further comprising the client-side security component accessing information indicating assertion providers with whom the user is registered, wherein the authentication policy information from the relying party comprises filter information usable by the client-side security component for determining which of the indicated assertion providers to present to the user via the user interface for selection by the user.

13. The computer implemented method as recited in claim 8, wherein forwarding the signed assertion token to a remote computer of the relying party further comprises forwarding the signed assertion token as a query parameter.

14. The computer implemented method as recited in claim 8, wherein the authentication policy information further comprises at least one Uniform Resource Identifier (URL) associated with an acceptable assertion provider to obtain the assertion token from.

15. Computer-accessible storage memory storing computer-executable program instructions on a client computer to implement a security component associated with a network-enabled application, wherein the security component is configured to:
receive authentication policy information at runtime on the client computer, the authentication policy information received from a remote computer of a relying party, the authentication policy information specifying that an assertion token is to be signed by the client computer prior to the client computer forwarding that assertion token to the relying party;
provide a user interface for a user to select an assertion provider;
send authentication credentials from the client computer to a remote computer of a selected assertion provider to authenticate the user of the client computer to the relying party;
receive an assertion token from a remote computer of the assertion provider, wherein the assertion token indicates the user of the client computer has been authenticated;
sign the assertion token on the client computer as specified in the authentication policy information received at runtime;
forward the signed assertion token from the client computer to a remote computer of the relying party; and
enable display of a region embedded within a user interface associated with the client computer, the user interface configured to display an image associated with the relying party, wherein an appearance associated with said embedded region is customizable for each relying party of a plurality of relying parties.

16. The computer-accessible storage memory as recited in claim 15, wherein the security component is configured to sign the assertion token in a manner as specified in the authentication policy information from the relying party so that the signed assertion token is only valid for a single use.

17. The computer-accessible storage memory as recited in claim 16, wherein the signed assertion token includes a nonce as specified in the authentication policy information from the relying party.

18. The computer-accessible storage memory as recited in claim 15, wherein the security component is configured to sign the assertion token using a key received from the assertion provider.

19. The computer-accessible storage memory as recited in claim 15, wherein the security component is further configured to access information indicating assertion providers with whom the user is registered, wherein the authentication policy information from the relying party comprises filter information usable by the security component to determine which of the indicated assertion providers to present to the user via the user interface for selection by the user.

20. The computer-accessible storage memory as recited in claim 15, wherein the security component is further configured to:

determine whether the relying party is reputable; and
enable display of an indication associated with whether the relying party is reputable in said embedded region.

21. The computer-accessible storage memory as recited in claim 20, wherein to enable display an indication further comprises:
- display of relying party information responsive to determining the relying party is reputable in said embedded region; and
- display of a different image than relying party information responsive to determining the relying party is not reputable in said embedded region.

* * * * *